United States Patent
Watanabe (10) Patent No.: US 10,313,539 B2
(45) Date of Patent: Jun. 4, 2019

(54) INFORMATION PROCESSING SYSTEM AND IMAGE FORMING APPARATUS

(71) Applicant: Konica Minolta, Inc., Chiyoda-ku, Tokyo (JP)

(72) Inventor: Yukio Watanabe, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/903,430

(22) Filed: Feb. 23, 2018

(65) Prior Publication Data
US 2018/0255190 A1 Sep. 6, 2018

(30) Foreign Application Priority Data
Mar. 6, 2017 (JP) .................................. 2017-041563

(51) Int. Cl.
| | |
|---|---|
| H04N 1/00 | (2006.01) |
| G06F 3/16 | (2006.01) |
| H04N 1/32 | (2006.01) |
| G06K 15/02 | (2006.01) |

(52) U.S. Cl.
CPC ........... *H04N 1/00233* (2013.01); *G06F 3/16* (2013.01); *G06K 15/1806* (2013.01); *H04N 1/00119* (2013.01); *H04N 1/32101* (2013.01)

(58) Field of Classification Search
USPC ...................................................... 358/1.15
See application file for complete search history.

(56) References Cited

U.S. PATENT DOCUMENTS

| | | | | |
|---|---|---|---|---|
| 5,444,771 | A * | 8/1995 | Ohnishi | H04N 1/32704 379/100.16 |
| 6,985,494 | B2 * | 1/2006 | Thompson | H04L 29/06 358/407 |
| 7,660,023 | B2 * | 2/2010 | Ito | H04N 1/32704 358/400 |
| 8,514,459 | B2 * | 8/2013 | Mita | H04M 11/066 358/434 |

(Continued)

FOREIGN PATENT DOCUMENTS

JP  8-317173 A  11/1996

*Primary Examiner* — Ngon B Nguyen
(74) *Attorney, Agent, or Firm* — Buchanan Ingersoll & Rooney PC (57) ABSTRACT

An information processing system, includes: a requesting side apparatus and a reproduction side apparatus in which a facsimile function is implemented to transmit and receive communication sounds through a switching equipment; a storage which stores recording data obtained by recording the communication sounds transmitted and received in the past; a controller which generates a reproduction instruction command to reproduce the recording data through the switching equipment, and transmits the reproduction instruction command to the reproduction side apparatus; a sound reproducer which reproduces, when the reproduction instruction command is received, the recording data processed by sectioning, with a soundless period, a FAX terminal identification signal included in the recording data for switching the operation mode of the switching equipment to a FAX mode, and transmits the recording data to the requesting side apparatus; and a sound recorder which records the processed recording data reproduced by the sound reproducer.

20 Claims, 7 Drawing Sheets

(56) References Cited

U.S. PATENT DOCUMENTS

2004/0022237 A1* 2/2004 Elliott ................ H04L 12/6418
370/356
2008/0043938 A1* 2/2008 Yasuda ............... H04M 1/6505
379/88.08

* cited by examiner

| JOB No | Date/Time | Destination | Status | Recording Data | | ID |
|---|---|---|---|---|---|---|
| 10 | 20XX/XX/XX XX:XX | 042-XXX-XXXX | success | XMTR | RCVR | AAA010 |
| 11 | 20XX/XX/XX XX:XX | 042-XXX-XXXX | error | XMTR | RCVR | AAA011 |
| 12 | 20XX/XX/XX XX:XX | 042-XXX-XXXX | error | XMTR | RCVR | AAA012 |
| 13 | 20XX/XX/XX XX:XX | 042-XXX-XXXX | error | XMTR | RCVR | AAA013 |
| 14 | 20XX/XX/XX XX:XX | 042-XXX-XXXX | error | XMTR | RCVR | AAA014 |
| 15 | 20XX/XX/XX XX:XX | 042-XXX-XXXX | error | XMTR | RCVR | AAA015 |
| 16 | 20XX/XX/XX XX:XX | 042-XXX-XXXX | error | XMTR | RCVR | AAA016 |

Transmission Job History

Fig. 4

| JOB No | Date/Time | Destination | Status | Recording Data | | ID |
|---|---|---|---|---|---|---|
| 25 | 20XX/XX/XX XX:XX | 042-XXX-XXXX | success | XMTR | RCVR | AAA010 |
| 26 | 20XX/XX/XX XX:XX | 042-XXX-XXXX | error | XMTR | RCVR | AAA011 |
| 27 | 20XX/XX/XX XX:XX | 042-XXX-XXXX | error | XMTR | RCVR | BBB005 |
| 28 | 20XX/XX/XX XX:XX | 042-XXX-XXXX | error | XMTR | RCVR | CCC007 |
| 29 | 20XX/XX/XX XX:XX | 042-XXX-XXXX | error | XMTR | RCVR | AAA012 |
| 30 | 20XX/XX/XX XX:XX | 042-XXX-XXXX | error | XMTR | RCVR | AAA013 |
| 31 | 20XX/XX/XX XX:XX | 042-XXX-XXXX | error | XMTR | RCVR | CCC008 |

Reception Job History

INFORMATION PROCESSING SYSTEM AND IMAGE FORMING APPARATUS

The entire disclosure of Japanese Patent Application No. 2017-041563 filed on Mar. 6, 2017 is incorporated herein by reference in its entirety.

BACKGROUND

Technological Field

The present disclosure relates to an information processing system and an image forming apparatus.

Description of the Related Art

Conventionally, communication errors due to line failure have increased during facsimile communication using an IP telephone network, i.e., VoIP (Voice Over Internet Protocol). This type of communication errors is caused when signals are processed by a switching equipment in the middle of a communication pathway between the call transmission end and the call reception end. It is thereby difficult to identify the cause of communication errors by analyzing T.30 commands or the like only with reference to a protocol trace list. In the present circumstances, the cause of communication errors has been identified by going to the place where communication equipment such as a facsimile is installed to record communication sounds. Incidentally, it has been proposed to reproduce recorded sound data on a telephone line for the purpose of improving the labor to go to the installation place (for example, refer to Japanese Unexamined Patent Application Publication No. 08-317173).

SUMMARY

However, in accordance with such a prior art technique as described in Japanese Unexamined Patent Application Publication No. 08-317173, when the recorded sound data is reproduced on the telephone line, as it, the recorded sound data is processed by a switching equipment in the middle of a communication pathway between the call transmission end and the call reception end. The recorded sound data can thereby not be correctly analyzed by a receiver apparatus at the destination end.

Taking into consideration the above circumstances, it is an object of the present disclosure therefore to provide an information processing system in which recorded sound data can be correctly analyzed by the receiver apparatus at the destination end.

To achieve at least one of the abovementioned objects, according to an aspect of the present invention, an information processing system which transmits and receives sound data through a switching equipment, comprises: a requesting side apparatus in which a facsimile function is implemented to transmit and receive communication sounds through the switching equipment; a reproduction side apparatus in which a facsimile function is implemented to transmit and receive communication sounds through the switching equipment; a storage which stores recording data which is sound data obtained by recording the communication sounds which have been transmitted and received in the past; a controller which generates a reproduction instruction command to reproduce the recording data through the switching equipment, and transmits the reproduction instruction command to the reproduction side apparatus; a sound reproducer which reproduces, when the reproduction side apparatus receives the reproduction instruction command, the recording data which is processed by sectioning, with a soundless period, a FAX terminal identification signal which is included in the recording data and provided for switching the operation mode of the switching equipment to a FAX mode, and transmits the recording data to the requesting side apparatus; and a sound recorder which records the processed recording data which is reproduced by the sound reproducer.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENTS

Hereinafter, one or more embodiments of the present invention will be described with reference to the drawings. However, the scope of the invention is not limited to the disclosed embodiments. Incidentally, as used in the detailed description of the embodiments, the terms "comprise," "consist of," "include," "including," "have," "incorporate," and any synonyms thereof, are intended to cover a non-exclusive inclusion. For example, a process, method, article, or apparatus that comprises a list of elements is not necessarily limited only to those elements, but may include other elements not expressly listed or inherent to such process, method, article, or apparatus. Furthermore, unless otherwise specifically indicated, the term "or" represents "inclusive or" but does not means "exclusive or". For example, "condition A or condition B" is true in any of the case that condition A is true and condition B is false, the case that condition A is false and condition B is true, and the case that condition A is true and condition B is true.

The present disclosure is related also to the apparatus that performs processing as described herein. Such an apparatus may specifically be built for the intended purpose, or may be built as a general purpose computer which is selectively activated or reconfigured by a computer program stored in the computer.

Also, the algorithm as explained here does not require a particular computer or apparatus. Various general purpose systems can be used together with a program which is designed in accordance with this description. Alternatively, it may be understood that a particular apparatus dedicated to perform necessary method steps can be conveniently used. The structure required for these various systems will be apparent from the following explanation. Furthermore, the present disclosure does not depend on any particular programming language. It will be understood that various programming languages can be used to realize the technique described here.

Figure 1:
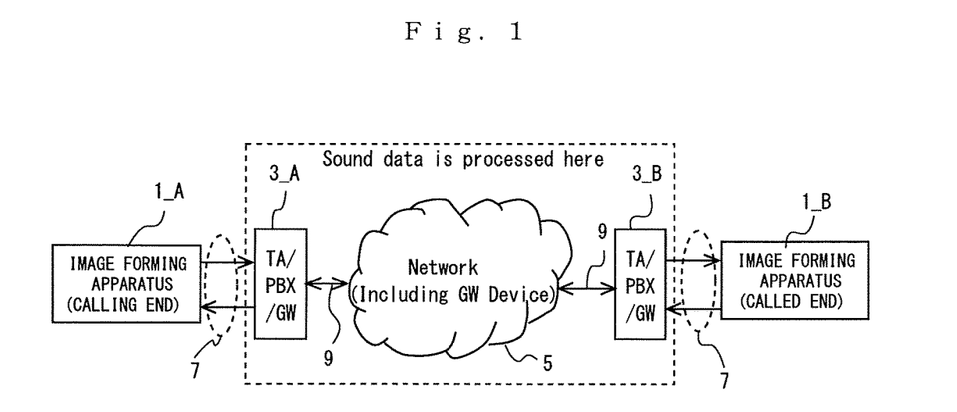
FIG. 1 is a schematic view for showing an example of the overall configuration of an information processing system in accordance with the present embodiment.

FIG. 1 is a schematic view for showing an example of the overall configuration of an information processing system of the present embodiment. As shown in FIG. 1, this system includes an image forming apparatus 1_A, an image forming apparatus 1_B, a switching equipment 3_A and a switching equipment 3_B. The switching equipment 3_A and the switching equipment 3_B are connected through a network 5. The image forming apparatus 1_A and the image forming apparatus 1_B can exchange various data including sound data through the switching equipment 3_A, the network 5 and the switching equipment 3_B, and can perform sound processing functions such as a facsimile function, a voice reproduction function and a voice recording function. Incidentally, the image forming apparatus 1_A and the image forming apparatus 1_B are collectively referred to simply as the image forming apparatus 1 when they need not be distinguished. Also, the switching equipment 3_A and the switching equipment 3_B are collectively referred to simply as the switching equipment 3 when they need not be distinguished. Furthermore, the network 5 may be an IP network or a telephone line network.

Incidentally, the image forming apparatus 1_A functions not only as a transmission end, i.e., a transmitter, but also as a requesting side apparatus, and is implemented with a facsimile function for transmitting and receiving communication sounds through the switching equipment 3_A. On the other hand, the image forming apparatus 1_B functions not only as a reception end, i.e., a receiver, but also as a reproduction side apparatus, and is implemented with a facsimile function for transmitting and receiving communication sounds through the switching equipment 3_B. Namely, the information processing system includes the image forming apparatus 1_A, the image forming apparatus 1_B, the switching equipment 3_A and the switching equipment 3_B to transmit and receive communication sounds through the switching equipment 3A and the switching equipment 3_B. Also, the requesting side apparatus or the reproduction side apparatus is the image forming apparatus 1. Incidentally, communication sounds mean data which is transmitted and received by VoIP communication. Furthermore, the switching equipment 3 transmits and receives communication sounds through the network 5, i.e., an IP network or a telephone line network.

Figure 2:
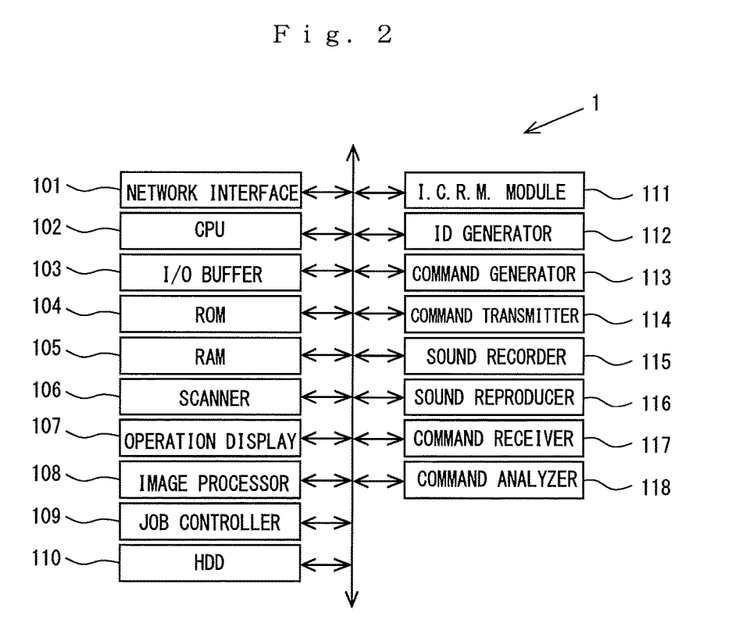
FIG. 2 is a block view for showing an image forming apparatus 1.

FIG. 2 is a block view for showing the image forming apparatus 1. As shown in FIG. 2, the image forming apparatus 1 includes a network interface 101, a CPU 102, an input/output buffer 103, a ROM 104, a RAM 105, a scanner 106, an operation display 107, an image processor 108, a job controller 109, an HDD 110, an incoming call response monitoring module 111, an ID generator 112, a command generator 113, a command transmitter 114, a sound recorder 115, a sound reproducer 116, an operation command receiver 117, a command analyzer 118 and the like for implementing the sound processing functions.

The network interface 101 performs various protocol conversion. The CPU 102 integrally controls the image forming apparatus 1 by loading a variety of modules stored in the ROM 104 and the HDD 110 on the RAM 105 and running the modules. The input/output buffer 103 temporarily stores various data to perform communication with the various data between the image forming apparatus 1 and the switching equipment 3. The input/output buffer 103 temporarily accumulates packets containing sound data, for example, as transmitted from the transmission end. The scanner 106 captures various images, characters or the like printed on recording mediums. The operation display 107 functions also as an input unit such as a touch panel for accepting operation from an operator. The operation display 107 outputs and displays various information to users. Specifically, the operation display 107 is composed of a liquid crystal display functioning as a display unit which is laminated with a touch panel functioning as an input unit. Also, while the display unit is a liquid crystal display in the above example, the present disclosure is not limited thereto but an organic ELD (Electro-Luminescence Display) can be used instead as the display unit. The image processor 108 forms an image on a recording medium by an electrophotographic system or the like. The job controller 109 manages and controls a variety of jobs. For example, the job controller 109 functions as a controller for controlling the incoming call response monitoring module 111, the ID generator 112, the command generator 113, the command transmitter 114, the sound recorder 115, the sound reproducer 116, the operation command receiver 117 and the command analyzer 118. Also, the HDD 110 functions as a storage which stores, for example, recording data which is obtained by recording past communication sounds.

The incoming call response monitoring module 111 detects the off-hook of the image forming apparatus 1 at the call reception end. The incoming call response monitoring module 111 monitors an incoming call response by, for example, monitoring voltage variation of a telephone line 7 through which the image forming apparatus 1 and the switching equipment 3 are connected, detecting polarity inversion on the telephone line 7 or monitoring the network protocol on a communication line 9 through which the network 5 and the switching equipment 3 are connected, to detect an off-hook. Specifically, in the case where the switching equipment 3 transmits and receives communication sounds through an IP network, the incoming call response monitoring module 111 monitors an incoming call response on the communication line 9 through which the switching equipment 3 is connected with the IP network. The ID generator 112 associates job ID information with apparatus ID information when a reproduction instruction command is transmitted. A job is performed by the image forming apparatus 1. The job ID information is managed, for example, by assigning numbers to jobs respectively. The apparatus ID information is given as a device identifier which identifies particular one of a plurality of the image forming apparatuses 1. For example, the apparatus ID information identifies, from among the plurality of the image forming apparatuses 1, the image forming apparatus 1 located at least either of the transmitting end and the receiving end of sound data transmission. Specifically, the ID generator 112 associates the reproduction instruction command with apparatus ID information which identifies at least either of the requesting side apparatus and the reproduction side apparatus. The reproduction instruction command includes apparatus ID information. Also, the ID generator 112 associates a reproduction instruction command generated by the controller with the job ID which identifies a job by which the transmission and reception of communication sounds between the requesting side apparatus and the reproduction side apparatus is normally finished before a communication error occurs on the telephone line or the IP network. By this configuration, the controller transmits the reproduction instruction command associated with the job ID to the reproduction side apparatus. On the other hand, the sound reproducer 116 reproduces the recording data obtained by recording communication sounds corresponding to the job identified by a job ID, and transmits the recording data to the requesting side apparatus.

The command generator 113 generates various commands such as a reproduction instruction command. The reproduction instruction command includes at least apparatus ID information identifying the destination, and is transmitted from the calling end when instructing to start sound reproduction. The reproduction instruction command may include apparatus ID information at the receiving end of sound data, apparatus ID information at the transmitting end of sound data or job ID information. In other words, the reproduction instruction command can be issued either from the sound data transmitting end or the sound data receiving end by designating a device ID. Also, when a communication error occurs in the network 5, the reproduction instruction command may be executed by referring to the job history of the job or the like to execute the job which has been normally executed in the past. The command transmitter 114 transmits various commands such as a reproduction instruction command, for example, in the form of DTMF signals.

The sound recorder 115 records sounds transmitted on the telephone line of the network 5 with a circuit near a modular jack or a speaker circuit. When sound recording is finished, the sound recorder 115 stores the recorded sound data in association with job ID information and apparatus ID information. The sound reproducer 116 reproduces sound data digitized by the sound recorder 115 as analog sounds. That is, the sound recorder 115 stores the recording data obtained by recording communication sounds in the HDD 110. Namely, the sound recorder halts, when the reproduction by the sound reproducer 116 is completed, recording of the recording data, and stores the processed recording data in the HDD 110 functioning as a storage in association with job ID information which identifies the job for reproducing the recorded sound data. The command receiver 117 receives various commands from the communication partner. Incidentally, the command receiver 117 may be implemented as another circuit which is provided separate from a usual circuit for facsimile communication. The command analyzer 118 analyzes various received commands, and acquires the instruction content of the various commands, and various ID information such as job ID information and apparatus ID information.

Figure 3:
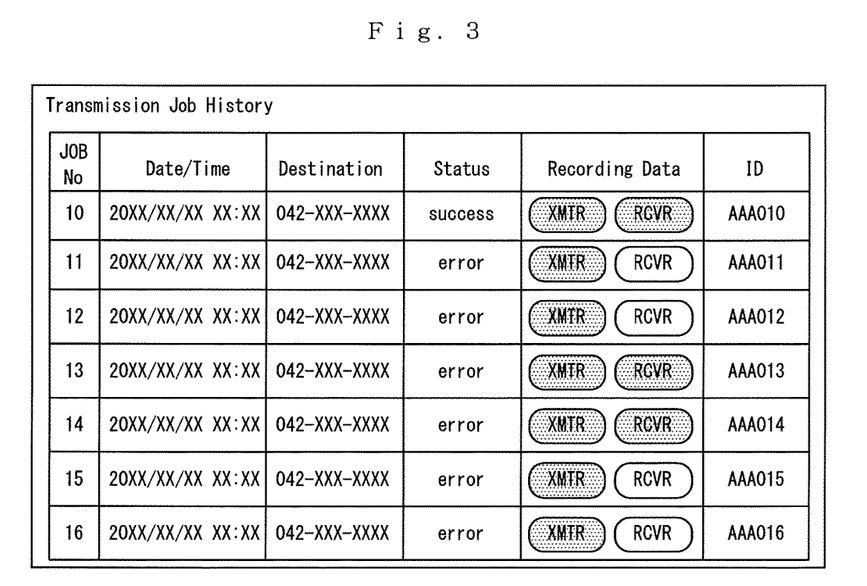
FIG. 3 is a table for showing an example of a transmission job history.
Figure 4:
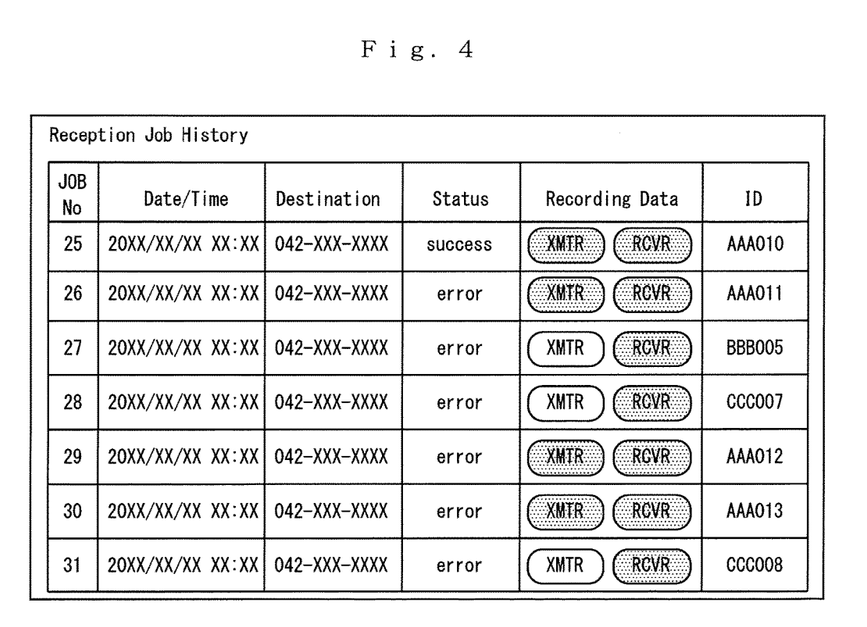
FIG. 4 is a table for showing an example of a reception job history.

Incidentally, while the reproduction instruction command is generated when an error occurs in the above example, the reproduction instruction command can be generated in response to an instruction from an operator rather than in response to occurrence of an error. FIGS. 3 and 4 are referred to show an operation example of the operation display 107 operated by an operator. FIG. 3 is a table displayed in the operation display 107 for showing an example of a transmission job history. FIG. 4 is a table displayed in the operation display 107 for showing an example of a reception job history. In FIGS. 3 and 4, there are buttons corresponding to the transmitter (XMTR) and buttons corresponding to the receiver (RCVR) in the column of recording data. These buttons are operable. The buttons corresponding to the transmitter correspond to the recording data of the transmitter side. The buttons corresponding to the receiver correspond to the recording data of the receiver side. The display state of each of the buttons corresponding to the transmitter and receiver is changed in accordance with whether or not recording data corresponding to the each button is stored in the HDD 110. In the case of the example shown in FIGS. 3 and 4, the display state is changed in color.

For example, in the case of the example shown in FIG. 3, a history of transmission jobs is displayed as a display screen of the operation display 107 of the transmitter. Accordingly, since all the recording data is stored in the HDD 110 in the transmitter side, all the buttons corresponding to the transmitter are changed in color, for example, changed to gray. On the other hand, with respect to the buttons corresponding to the receiver, only part of the buttons, i.e., only the buttons corresponding to jobs whose recording data is acquired and stored in the HDD 110 are changed in color. The remaining buttons corresponding to the receiver as shown in FIG. 3 correspond to jobs whose recording data is not acquired and not stored in the HDD 110 yet, and therefore are not changed in color, for example, displayed in white.

On the other hand, in the case of the example shown in FIG. 4, a history of reception jobs is displayed as a display screen of the operation display 107 of the receiver. Accordingly, since all the recording data is stored in the HDD 110 in the receiver side, all the buttons corresponding to the receiver are changed in color, for example, changed to gray. On the other hand, with respect to the buttons corresponding to the transmitter, only part of the buttons, i.e., only the buttons corresponding to jobs whose recording data is acquired and stored in the HDD 110 are changed in color. The remaining buttons corresponding to the transmitter as shown in FIG. 4 correspond to jobs whose recording data is not acquired and not stored in the HDD 110 yet, and therefore are not changed in color, for example, displayed in white.

Accordingly, in the case of the example shown in FIGS. 3 and 4, the reproduction instruction command is generated by operating a button which is not changed in color as a command to request reproduction of recording data, and output to the reproduction side apparatus from the requesting side apparatus. Namely, the job controller 109 functioning as a controller generates the reproduction instruction command to request reproduction of recording data through the switching equipment 3, and transmits the reproduction instruction command to the reproduction side apparatus. As has been discussed above, the reproduction instruction command is generated not only when a communication error occurs but also in response to an instruction from an operator. Specifically, the reproduction instruction command is given a job ID corresponding to a button which is selected by the operator. In other words, the ID generator 112 associates the reproduction instruction command with the job ID of a job corresponding to the recording data designated by the operator.

Incidentally, while the display state is changed in color in the case of the example shown in FIGS. 3 and 4, the present disclosure is not limited thereto. For example, the display state can be changed by lighting on a button when the corresponding recorded data is stored in the HDD 110, and lighting off a button when the corresponding recorded data is not stored in the HDD 110. Alternatively, for example, the display state can be changed by blinking a button when the corresponding recorded data is stored in the HDD 110, and lighting on a button when the corresponding recorded data is not stored in the HDD 110. In short, it is only required that an operator can recognize whether or not the corresponding recorded data is stored in the HDD 110. Accordingly, the display state can be changed not only by a visual change but also by a change in an auditory sensation or another sensory organ. For example, voice, vibration or the like, or any combination thereof may be output to an operator when the corresponding recorded data is not stored in the HDD 110.

Figure 5:
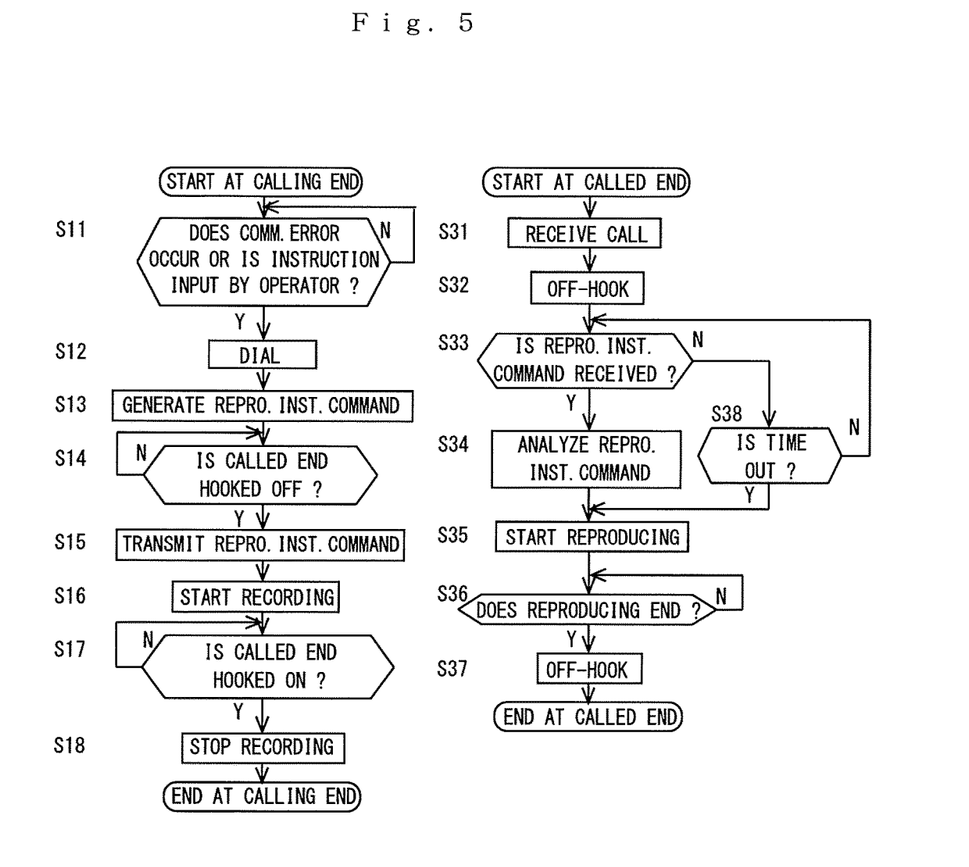
FIG. 5 is a flow chart for explaining a control example of an image forming apparatus 1.

FIG. 5 is a flow chart for explaining a control example of the image forming apparatus 1. In FIG. 5, it is assumed that the processes in step S11 through step S18 are performed by the image forming apparatus 1_A as the calling end, and that the processes in step S31 through step S38 are performed by the image forming apparatus 1_B as the called end. Meanwhile, the calling end is the apparatus which transmits a reproduction instruction command, and the called end is the apparatus which receives the reproduction instruction command. Also, it is assumed that the sound data to be reproduced in response to the reproduction instruction command is the recorded sound data which is recorded through the network 5.

In step S11, it is determined whether or not a communication error occurs or whether or not an instruction is input by an operator. If it is determined that a communication error occurs or that an instruction is input by an operator (step S11; Y), the process proceeds to step S12. Namely, if a communication error occurs on the telephone line or the IP network when the requesting side apparatus transmits and receives communication sounds, the controller generates and transmits the reproduction instruction command to the reproduction side apparatus. Also, when an instruction is input by an operator to reproduce recording data, the controller generates and transmits the reproduction instruction command to the reproduction side apparatus. On the other hand, it is determined that a communication error does not occur and that an instruction is not input by an operator (step S11; N), step S11 is repeated. In step S12, the calling end dials the called end. In step S13, a reproduction instruction command is generated. In step S14, it is determined whether or not the called end is hooked off. If it is determined that the called end is hooked off (step S14: Y), the process proceeds to step S15. Conversely, if it is determined that the called end is not hooked off (step S14: N), step S14 is repeated. In step S15, the reproduction instruction command is transmitted. In step S16, recording is started. In step S17, it is determined whether or not the called end is hooked on. If it is determined that the called end is hooked on (step S17: Y), the process proceeds to step S18. Conversely, if it is determined that the called end is not hooked on (step S17: N), step S17 is repeated. In step S18, recording is stopped, and the process at the calling end is finished.

In step S31, the called end is called. In step S32, the called end is hooked off. In step S33, it is determined whether or not the reproduction instruction command is received. If it is determined that the reproduction instruction command is received, (step S33: Y), the process proceeds to step S34. Conversely, if it is determined that the reproduction instruction command is not received, (step S33: N), the process proceeds to step S38. In step S34, the reproduction instruction command is analyzed. More specifically speaking, the reproduction instruction command is analyzed by identifying the recording data to be reproduced with reference to the job ID included in the reproduction instruction command. In step S35, reproduction is started by the sound reproducer 116. The sound reproducer 116 reproduces recording data which is processed by sectioning a FAX terminal identification signal to be described below with soundless periods. Specifically, the sound reproducer 116 may reproduce recording data which is generated while performing the sectioning process. Alternatively, the sound reproducer 116 may reproduce recording data which has been generated in advance by performing the sectioning process. In step S36, it is determined whether or not reproduction has been finished. If it is determined that reproduction has been finished (step S36; Y), the process proceeds to step S37. Conversely, if it is determined that reproduction has not been finished yet (step S36; N), step S36 is repeated. In step S37, the called end is hooked on, and the procedure at the called end is finished. In step S38, it is determined whether or not time is out. If it is determined that time is out (step S38: Y), the process proceeds to step S35. Conversely, if it is determined that time is not out (step S38: N), the process is returned to step S33.

Figure 6:
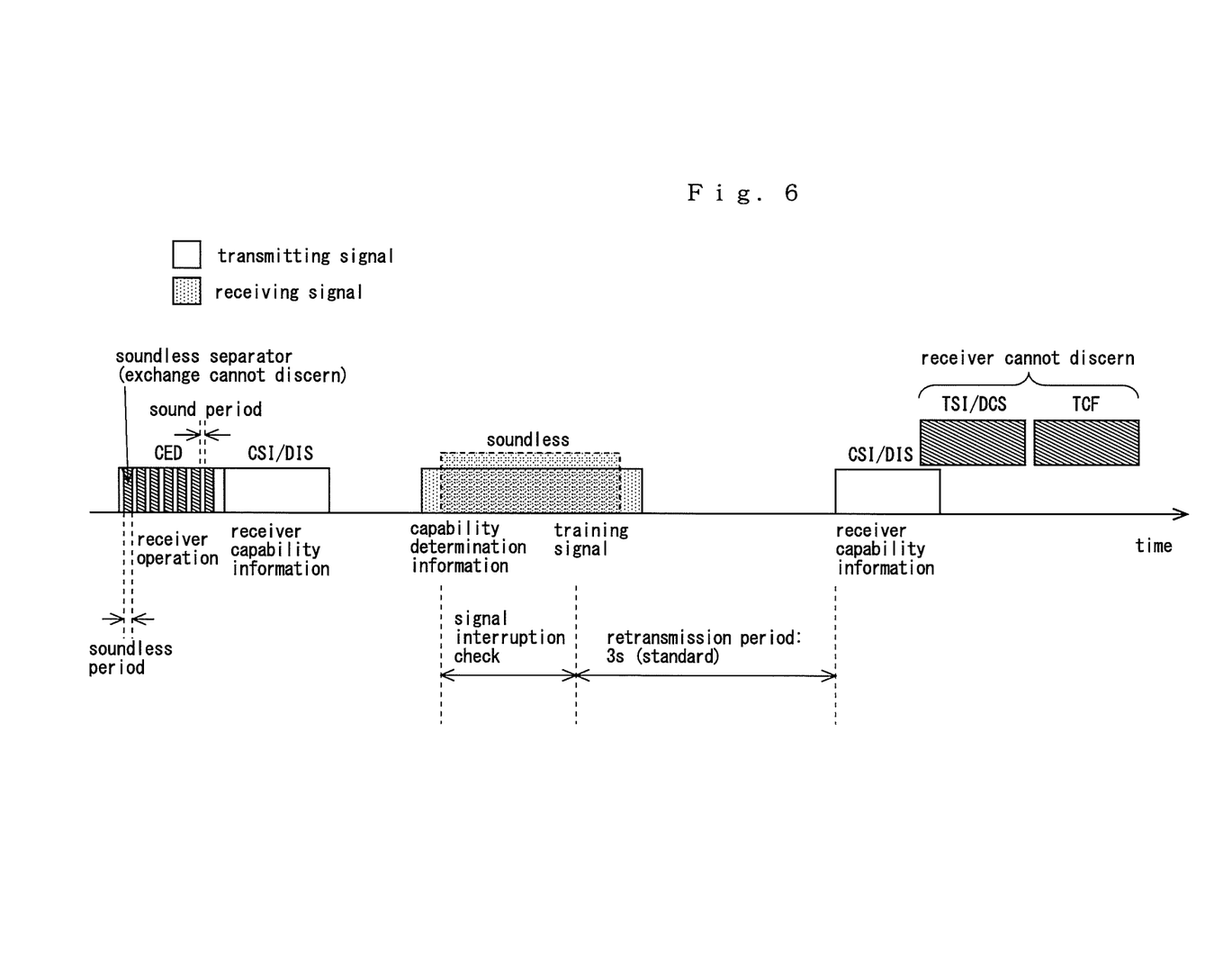
FIG. 6 is a schematic view for showing an example in which recorded sound data is processed for the purpose of having a switching equipment 3 operate in a voice mode.

FIG. 6 is a schematic view for showing an example in which recorded sound data is processed for the purpose of having the switching equipment 3 operate in a voice mode. If the recorded sound data is reproduced through the network 5, as it, the switching equipment 3 switches its operation mode from a voice mode to a FAX mode so that the recorded sound data is processed and may not be reproduced as intended. For this reason, as illustrated in FIG. 6, the switching equipment 3 is prevented from switching its operation mode to the FAX mode by processing the signal portion that is interpreted as a FAX signal by the switching equipment 3.

Specifically, the recorded sound data is processed in order that the switching equipment 3 cannot recognize a FAX terminal identification signal such as CNG, CED, ANSam or the like. For example, the FAX terminal identification signal is sectioned by a square wave in order that an ON state period is shorter than 50 ms and an OFF state period (soundless period) is longer than 100 ms. Namely, soundless periods are inserted into the FAX terminal identification signal as soundless separators.

Specifically, for example, since a time period in which an ON state is maintained and a time period in which an OFF state is maintained are predetermined in the CNG signal as a calling tone, the switching equipment 3 is prevented from recognizing a FAX terminal identification signal by interrupting such a maintained state of the CNG signal. In other words, the reproduction instruction command is used as a trigger to change at least either of the time period in which an ON state of the FAX terminal identification signal contained in the recorded sound data is maintained and a time period in which an OFF state of the FAX terminal identification signal contained in the recorded sound data is maintained. Meanwhile, information necessary for analysis in the example of FIG. 6 is contained in the CSI signal or the DIS signal indicative of the receiver capability information so that soundless periods as soundless separators are not created in these signals.

Figure 7:
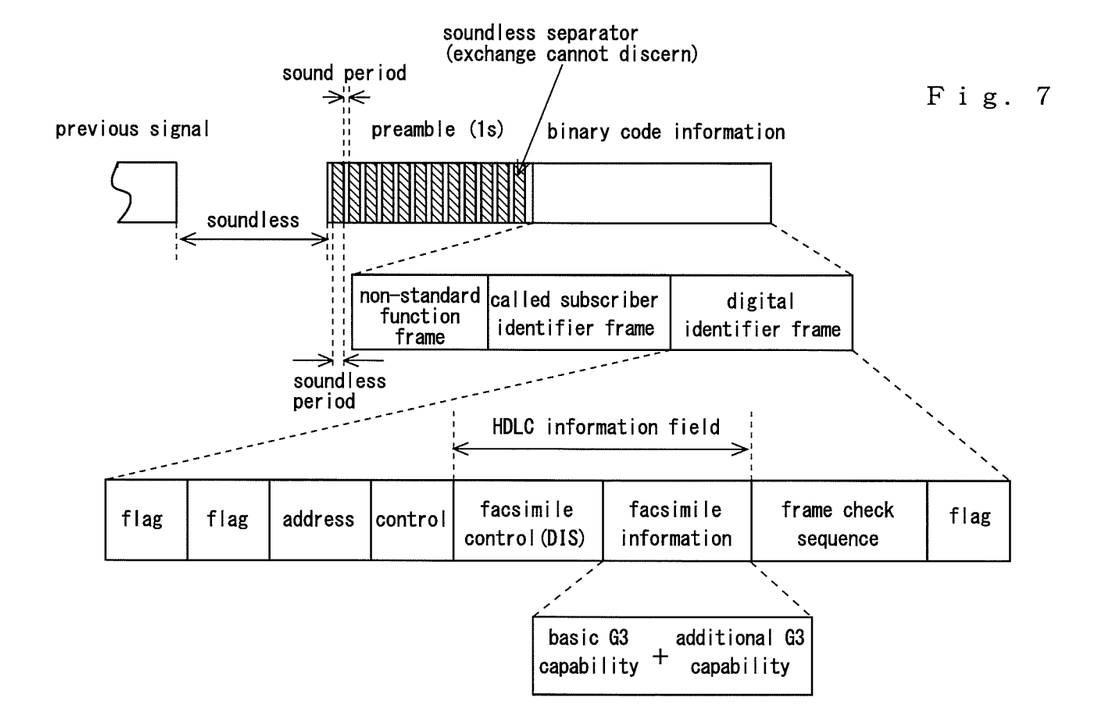
FIG. 7 is a schematic view for showing an example in which recorded sound data is processed for the purpose of having the switching equipment 3 operate in a voice mode in accordance with V.21 standard.

FIG. 7 is a schematic view for showing an example in which recorded sound data is processed for the purpose of having the switching equipment 3 operate in a voice mode in accordance with V.21 standard. Also in FIG. 7, soundless periods as soundless separators are created in the preamble in the same manner as in FIG. 6, Meanwhile, information necessary for analysis in the example of FIG. 7 is contained in the DIS signal, the DCS signal, the EOP signal, the MCF signal, the DCN signal or the like contained in an HDLC information field so that soundless periods as soundless separators are not created in these signals.

Figure 8:
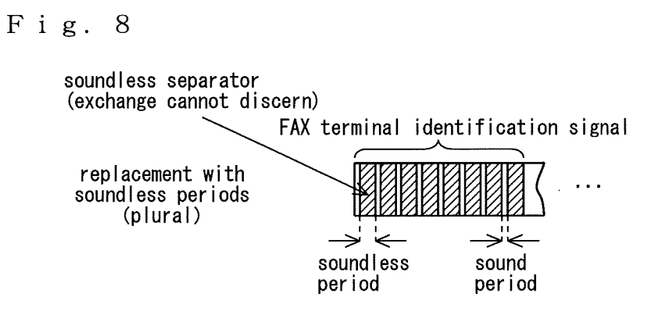
FIG. 8 is a schematic view for showing an example of processing the recorded sound data for the purpose of having the switching equipment 3 operate in a voice mode by partially replacing a FAX terminal identification signal with a plurality of soundless periods.
Figure 9:
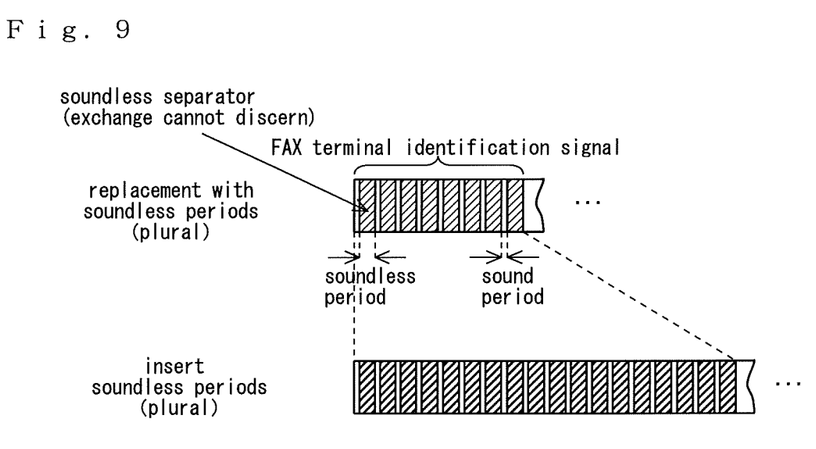
FIG. 9 is a schematic view for showing an example of processing the recorded sound data for the purpose of having the switching equipment 3 operate in a voice mode by inserting soundless periods into the FAX terminal identification signal.
Figure 10:
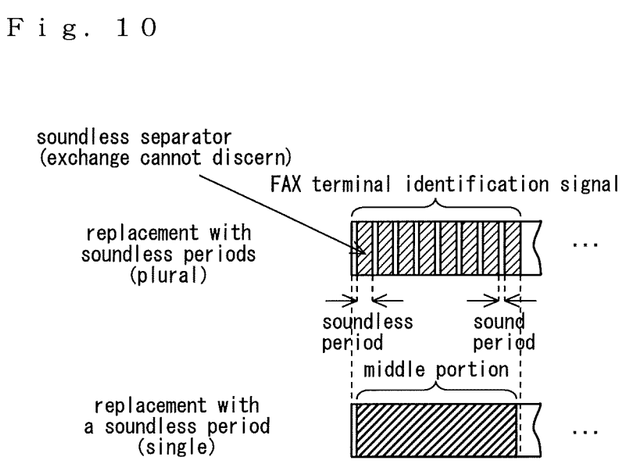
FIG. 10 is a schematic view for showing an example of processing the recorded sound data for the purpose of having the switching equipment 3 operate in a voice mode by replacing a middle portion of the FAX terminal identification signal with a single soundless period.

Next is an explanation of a process of sectioning the FAX terminal identification signal by soundless separators with reference to FIGS. 8 through 10. FIG. 8 is a schematic view for showing an example of processing the recorded sound data for the purpose of having the switching equipment 3 operate in a voice mode by partially replacing the FAX terminal identification signal with a plurality of soundless periods. Also in FIG. 8, soundless periods as soundless separators are created in the FAX terminal identification signal in the same manner as in FIG. 6. Specifically, a square wave forming soundless separators is superimposed on the FAX terminal identification signal as a process of the FAX terminal identification signal in the recording data which is sound data obtained by recording communication sounds. That is, the FAX terminal identification signal is sectioned by partially replacing the FAX terminal identification signal with soundless periods in correspondence with the space durations of the square wave. By this configuration, even if the FAX terminal identification signal is analyzed by the switching equipment 3, the switching equipment 3 cannot recognize the FAX terminal identification signal so that the switching equipment 3 does not switch its operation mode to a FAX mode. The recording data reproduced by the sound reproducer 116 is thereby correctly transmitted to the requesting side apparatus in a voice mode. In other words, the recording data reproduced by the sound reproducer 116 is correctly transmitted to the requesting side apparatus as sound data. Incidentally, while a square wave is superimposed in the case of the above example, the present disclosure is not limited thereto. For example, it is possible to superimpose a sine wave, a saw wave, a trapezoid wave, a ramp wave or any synthesized wave by combining these waves on the FAX terminal identification signal.

FIG. 9 is a schematic view for showing an example of processing the recorded sound data for the purpose of having the switching equipment 3 operate in a voice mode by inserting soundless periods into the FAX terminal identification signal. In FIG. 9, the FAX terminal identification signal is sectioned by inserting soundless periods into the FAX terminal identification signal. By this configuration, even if the FAX terminal identification signal is analyzed by the switching equipment 3, the switching equipment 3 cannot recognize the FAX terminal identification signal so that the switching equipment 3 does not switch its operation mode to a FAX mode. Accordingly, the recording data reproduced by the sound reproducer 116 is correctly transmitted to the requesting side apparatus in a voice mode. In other words, the recording data reproduced by the sound reproducer 116 is correctly transmitted to the requesting side apparatus as sound data. Namely, the example shown in FIG. 9 is a process of dividing the FAX terminal identification signal into segments and inserting a plurality of soundless periods between the segments of the FAX terminal identification signal which is divided. The FAX terminal identification signal itself is thereby not lost by replacement with soundless periods. Accordingly, when analyzing recording data, the FAX terminal identification signal can be recovered by removing soundless periods inserted into the FAX terminal identification signal from the recording data.

However, in either case of FIGS. 8 and 9, the switching equipment 3 can switch its operation mode to a FAX mode unless the duration of soundless periods is set to an appropriate length. Specifically, a determination period is predetermined in the switching equipment 3. The switching equipment 3 determines whether to switch its operation mode to a FAX mode the determination period. Specifically, the switching equipment 3 determines whether or not the signal received during the determination period is corresponding to the signal pattern of the FAX terminal identification signal. Because of this, for the purpose of preventing the signal received during the determination period from being recognized by the switching equipment as the FAX terminal identification signal, it is required to set the length of a soundless period to be longer than the determination period, and set the length of each segment of the FAX terminal identification signal sectioned by the soundless periods, i.e., a sound period to be smaller than the determination period. By appropriately setting the length of the soundless period and the length of the sound period between the soundless periods in this manner, even when recording data processed as described above is reproduced, the FAX terminal identification signal is not recognized by the switching equipment so that it is possible to surely prevent the operation mode of the switching equipment 3 from being switched to a FAX mode. For example, in the case where the determination period is 75 ms, it is preferred to set the length of a soundless period to be no shorter than 100 ms which is longer than the determination period and set the length of a sound period to be shorter than 50 ms which is shorter than the determination period.

FIG. 10 is a schematic view for showing an example of processing the recorded sound data for the purpose of having the switching equipment 3 operate in a voice mode by replacing a middle portion of the FAX terminal identification signal with a single soundless period. In the case of the example shown in FIG. 10, since the middle portion of the FAX terminal identification signal is replaced with a single soundless period, only the leading portion and the end portion of the FAX terminal identification signal remains. Even in this case, the length of the soundless period and the length of the sound period have to be set in order to maintain the operation mode of the switching equipment 3 in a voice mode rather than to switch the operation mode of the switching equipment 3 to a FAX mode. Specifically, for the purpose of preventing the FAX terminal identification signal from being recognized, the lengths of the remaining sound periods, i.e., the leading portion and the end portion of the FAX terminal identification signal have to be shorter than the determination period.

Figure 11:
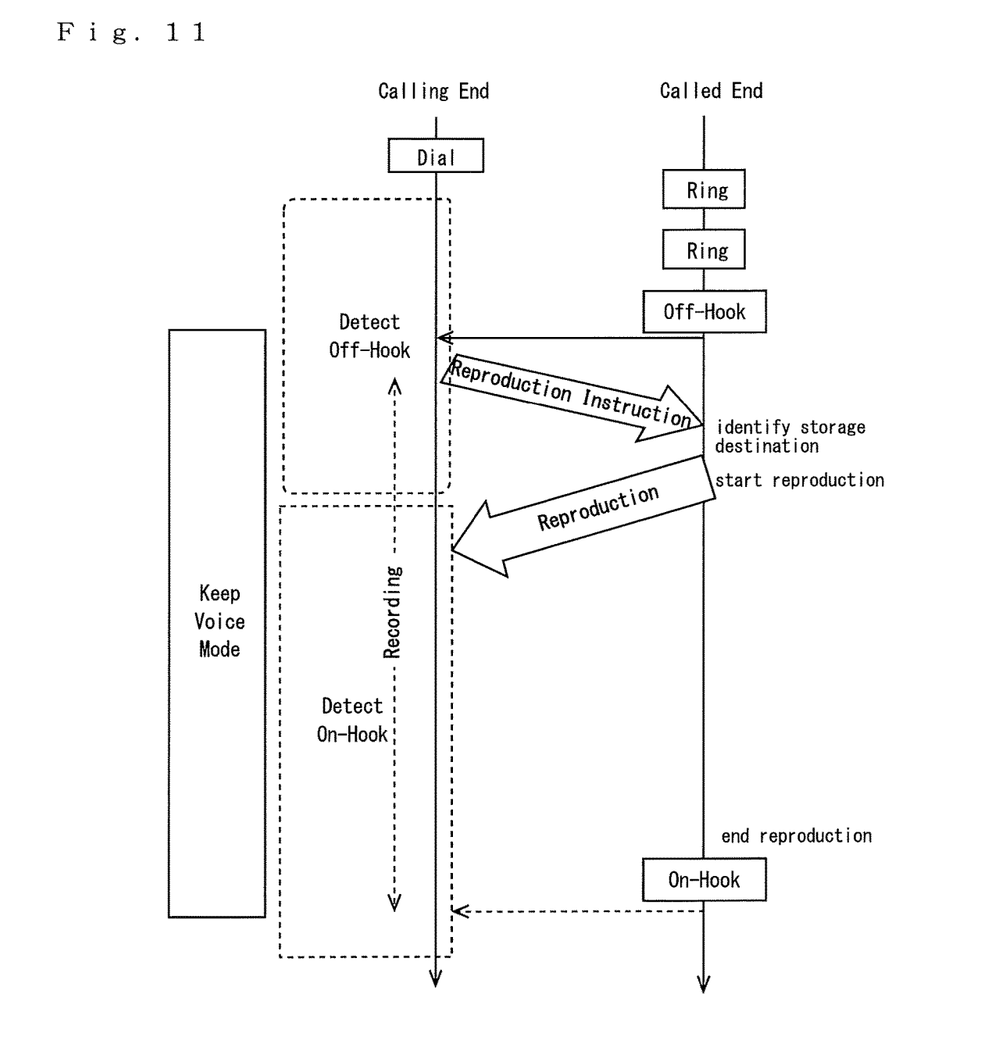
FIG. 11 shows a sequence of reproducing recorded sound data on a network 5.

FIG. 11 shows a sequence of reproducing recorded sound data on the network 5. After completion of sound data communication, the calling end dials, and transmits a reproduction instruction command after the calling end connects to the called end. In other words, the calling end transmits no signal until an off-hook is detected. The called end reproduces recording data after receiving the reproduction instruction command and identifying the storage destination of the recording data to be reproduced. The calling end, which transmits the reproduction instruction command, acquires the recorded sound data of the communication partner as the called end receiving the reproduction instruction command. As described above, while the switching equipment 3 keeps its voice mode, the called end receiving the reproduction instruction command performs reproduction. Incidentally, when reproducing recording data which is generated while performing the sectioning process, the storage destination is identified by identifying the storage destination of the recording data. On the other hand, when reproducing recording data which has been processed in advance, the storage destination is identified by identifying the storage destination of the recording data which has been processed in advance.

As has been discussed above, in the case of the information processing system of the present embodiment, when the reproduction side apparatus receives the reproduction instruction command, the recorded sound data can be correctly analyzed at the destination of the recorded sound data by reproducing, to the requesting side apparatus, the recording data which is processed by sectioning the FAX terminal identification signal, which is provided for switching the operation mode of the switching equipment 3 to a FAX mode, with soundless periods.

Also, when an incoming call response is detected, the calling end of the plurality of image forming apparatuses 1 transmits a reproduction instruction command to the called end, so that it is possible to ensure, while securing a communication channel, the transmission of the reproduction instruction command to the called end.

Furthermore, one of the plurality of the image forming apparatuses 1 functioning as the receiving end of the recorded sound data can be identified by associating the reproduction instruction command with apparatus ID information which identifies the receiving end of the recorded sound data so that the communication partner having the recorded sound data can surely be identified.

Still further, the circuit network connecting the image forming apparatus 1 and the switching equipment 3 can be monitored by monitoring voltage variation, detecting polarity inversion or monitoring the network protocol of the network 5, so that it is possible to monitor the site where sound data communication is involved in the information processing system.

Still further, when a reproduction instruction command is transmitted, the reproduction instruction command makes the called end as one of the plurality of the image forming apparatuses 1 reproduce recorded sound data, and when the sound data is reproduced by the sound reproducer 116, the calling end as one of the plurality of the image forming apparatuses 1 transmitting the reproduction instruction command records the recorded sound data reproduced by the sound reproducer 116, so that it is possible to compare the recorded sound data already transmitted to the communication partner and the recorded sound data transmitted from the communication partner, and specifically analyze the failure of the network 5.

Still further, recording recorded sound data is stopped when finishing reproduction of the recorded sound data, and the recorded sound data is stored in association with apparatus ID information and job ID information which identifies the job for reproducing the recorded sound data, so that the job, the apparatus and the recorded sound data can be associated with each other, and therefore it is possible to separate failures of the network 5.

Still further, when a communication error occurred on the network 5, a reproduction instruction command is generated for reproducing, from among jobs identified by job ID information, a job before the communication error occurred, so that the data during normal communication and the data during communication error can be compared to extract the cause of the communication error.

The information processing system 1 have been explained based on the embodiments in accordance with the present disclosure. However, it is not intended to limit the present disclosure to the precise form described, and obviously many modifications and variations are possible without departing from the spirit and scope of the invention.

For example, while recording is started in step S35 in the above example, the present disclosure is not limited thereto, but recording can be started in step S32 with an off-hook as a trigger.

Meanwhile, the series of processes as described above may be performed by hardware or software. In the case where the series of processes are performed by software, various programs of the software are installed in a computer which can realize the above functions by running the various programs, and the various programs can be installed by reading them from a recording medium or downloading them from the Internet.

Although embodiments of the present invention have been described and illustrated in detail, the disclosed embodiments are made for purposes of illustration and example only and not limitation. The scope of the present invention should be interpreted by terms of the appended claims.

What is claimed is:

1. An information processing system which transmits and receives sound data through a switching equipment, comprising:
   a requesting side apparatus in which a facsimile function is implemented to transmit and receive communication sounds through the switching equipment;
   a reproduction side apparatus in which a facsimile function is implemented to transmit and receive communication sounds through the switching equipment;
   a storage which stores recording data which is sound data obtained by recording the communication sounds which have been transmitted and received in the past;
   a controller which generates a reproduction instruction command to reproduce the recording data through the switching equipment, and transmits the reproduction instruction command to the reproduction side apparatus;
   a sound reproducer which reproduces, when the reproduction side apparatus receives the reproduction instruction command, the recording data which is processed by sectioning, with a soundless period, a FAX terminal identification signal which is included in the recording data and provided for switching the operation mode of the switching equipment to a FAX mode, and transmits the recording data to the requesting side apparatus;
   wherein the processed recording data including the sectioned FAX terminal identification signal does not switch the operation mode of the switching equipment to the FAX mode; and
   a sound recorder which records the processed recording data which is reproduced by the sound reproducer.

2. The information processing system of claim 1 wherein the sound reproducer sets the length of the soundless period to be longer than a determination period which determines whether to switch the operation mode to the FAX mode.

3. The information processing system of claim 2 wherein the sound reproducer sets the length of each of segments, into which the FAX terminal identification signal is divided by the soundless period, to be shorter than the determination period.

4. The information processing system of claim 1 wherein when the controller transmits the reproduction instruction command, the sound recorder starts recording of the recording data.

5. The information processing system of claim 1 further comprising:
an incoming call response monitoring module which monitors an incoming call response on a telephone line to which the switching equipment is connected, wherein
after the incoming call response monitoring module detects an incoming call response, the controller transmits the reproduction instruction command to the reproduction side apparatus.

6. The information processing system of claim 5 wherein the incoming call response monitoring module monitors the incoming call response by monitoring voltage variation on the telephone line or detecting polarity inversion on the telephone line.

7. The information processing system of claim 5 wherein the switching equipment transmits and receives the communication sounds through a telephone line network or an IP network.

8. The information processing system of claim 7 wherein the switching equipment transmits and receives the communication sounds through the IP network, and wherein
the incoming call response monitoring module monitors an incoming call response on a communication line through which the IP network and the switching equipment are connected.

9. The information processing system of claim 7 wherein if a communication error occurs on the telephone line or the IP network when the requesting side apparatus transmits and receives the communication sounds, the controller generates and transmits the reproduction instruction command to the reproduction side apparatus.

10. The information processing system of claim 8 wherein the incoming call response monitoring module monitors the incoming call response by monitoring a network protocol on the communication line.

11. The information processing system of claim 1 further comprising
an ID generator which associates the reproduction instruction command with apparatus ID information which identifies at least either of the requesting side apparatus and the reproduction side apparatus, wherein
the reproduction instruction command includes the apparatus ID information.

12. The information processing system of claim 11 wherein
when the reproduction by the sound reproducer is completed, the sound recorder halts recording of the recording data, and stores the processed recording data in the storage in association with job ID information which identifies a job for reproducing the recorded sound data.

13. The information processing system of claim 11 wherein
the ID generator associates the reproduction instruction command generated by the controller with a job ID which identifies a job by which transmission and reception of the communication sounds between the requesting side apparatus and the reproduction side apparatus is normally finished before a communication error occurs on the telephone line or the IP network, wherein
the controller transmits the reproduction instruction command associated with the job ID to the reproduction side apparatus, and wherein
the sound reproducer reproduces the recording data obtained by recording the communication sounds corresponding to the job identified by the job ID, and transmits the recording data to the requesting side apparatus.

14. The information processing system of claim 1 wherein when an instruction to reproduce the recording data is input by an operator, the controller generates and transmits the reproduction instruction command to the reproduction side apparatus.

15. The information processing system of claim 1 wherein the requesting side apparatus or the reproduction side apparatus is an image forming apparatus.

16. An image forming apparatus which is implemented with a facsimile function to transmit communication sounds to a reproduction side apparatus or receive the communication sounds from the reproduction side apparatus through a switching equipment and through a telephone line network or an IP network connected to the switching equipment, comprising:
a controller which generates, when a communication error occurs during transmitting communication sounds to a reproduction side apparatus or receiving the communication sounds from the reproduction side apparatus through the telephone line network or the IP network, a reproduction instruction command to request reproduction of recording data through the switching equipment where the reproduced recording data includes a sectioned FAX terminal identification signal that does not switch an operation mode of the switching equipment to a FAX mode, and transmits the reproduction instruction command to the reproduction side apparatus; and
a sound recorder which records the recording data which is reproduced by the sound reproducer.

17. The image forming apparatus of claim 16 further comprising:
an ID generator which associates the reproduction instruction command generated by the controller with a job ID which identifies a job by which transmission and reception of communication sounds between a requesting side apparatus and the reproduction side apparatus is normally finished before a communication error occurs on the telephone line or the IP network, wherein
the controller transmits the reproduction instruction command associated with the job ID to the reproduction side apparatus.

18. The image forming apparatus of claim 16 wherein when an instruction to reproduce the recording data is input by an operator, the controller generates and transmits the reproduction instruction command to the reproduction side apparatus.

19. An image forming apparatus which is implemented with a facsimile function to receive communication sounds from a requesting side apparatus or transmit the communication sounds to the requesting side apparatus through a switching equipment and through a telephone line network or an IP network connected to the switching equipment, comprising:
a storage which stores recording data which is sound data obtained by recording the communication sounds which have been transmitted and received in the past; and a sound reproducer which reproduces, when the image forming apparatus receives a reproduction instruction command to reproduce the recording data through the switching equipment from the requesting side apparatus, the recording data which is processed by sectioning, with a soundless period, a FAX terminal identification signal which is included in the recording data and provided for switching the operation mode of the switching equipment to a FAX mode, and transmits the recording data to the requesting side apparatus;

wherein the processed recording data including the sectioned FAX terminal identification signal does not switch the operation mode of the switching equipment to the FAX mode.

20. The image forming apparatus of claim 19 wherein the sound reproducer reproduces the recording data obtained by recording the communication sounds corresponding to a job identified by a job ID associated with the reproduction instruction command, and transmits the recording data to the requesting side apparatus.

* * * * *